United States Patent
Dojiri

(10) Patent No.: US 12,323,029 B2
(45) Date of Patent: Jun. 3, 2025

(54) INVERTER-INTEGRATED ELECTRIC MOTOR

(71) Applicant: KABUSHIKI KAISHA TOYOTA JIDOSHOKKI, Aichi (JP)

(72) Inventor: Atsushi Dojiri, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 278 days.

(21) Appl. No.: 18/122,840

(22) Filed: Mar. 17, 2023

(65) Prior Publication Data
US 2023/0307984 A1 Sep. 28, 2023

(30) Foreign Application Priority Data
Mar. 23, 2022 (JP) .................. 2022-046922

(51) Int. Cl.
*H02K 5/22* (2006.01)
*H02K 5/10* (2006.01)
*H02K 5/20* (2006.01)
*H02K 11/33* (2016.01)

(52) U.S. Cl.
CPC .............. *H02K 5/225* (2013.01); *H02K 5/10* (2013.01); *H02K 5/203* (2021.01); *H02K 11/33* (2016.01)

(58) Field of Classification Search
CPC .......... H02K 5/225; H02K 5/203; H02K 5/10; H02K 5/128; H02K 2205/09; H02K 7/14; H02K 11/00; H02K 11/33
USPC .......................................................... 310/71
See application file for complete search history.

(56) References Cited

U.S. PATENT DOCUMENTS

| | | | | | |
|---|---|---|---|---|---|
| 2,323,146 | A | * | 6/1943 | Manney | H02K 9/24 220/88.1 |
| 5,006,742 | A | * | 4/1991 | Strobl | H02K 5/225 310/43 |
| 5,010,265 | A | * | 4/1991 | Tanaka | F02N 15/00 74/6 |
| 5,077,503 | A | * | 12/1991 | Tamura | H02K 5/10 310/88 |
| 5,767,596 | A | * | 6/1998 | Stark | H02K 5/04 310/91 |

(Continued)

FOREIGN PATENT DOCUMENTS

JP 2020-165423 10/2020

*Primary Examiner* — Maged M Almawri
(74) *Attorney, Agent, or Firm* — Greenblum & Bernstein, P.L.C.

(57) ABSTRACT

An inverter-integrated electric motor includes: a motor housing; an inverter housing, and a metallic terminal. The motor housing and the inverter housing each have a projection having a terminal insertion hole through which the metallic terminal is inserted. The projections project while approaching each other, and each have a seal structure that surrounds the terminal insertion hole. One of the housings has a main projected-guide portion projecting more than the projection of the one of the housings and surrounding a part of the projection of the one of the housings. The other of the housings has an auxiliary projected-guide portion surrounding a part of the main projected-guide portion. The main projected-guide portion and the auxiliary projected-guide portion guide moisture intruded into a gap between the housings to suppress moisture retention around the seal structures.

5 Claims, 4 Drawing Sheets

(56) References Cited

U.S. PATENT DOCUMENTS

| | | | | |
|---|---|---|---|---|
| 5,872,410 A * | 2/1999 | Sudoff | | H02K 17/30 |
| | | | | 310/71 |
| 6,107,708 A * | 8/2000 | Yamaguchi | | H02K 9/06 |
| | | | | 310/58 |
| 6,371,167 B1 * | 4/2002 | Hosoya | | F16L 9/22 |
| | | | | 138/37 |
| 7,067,946 B2 * | 6/2006 | Noda | | F04D 29/5806 |
| | | | | 310/68 R |
| 7,898,126 B2 * | 3/2011 | Kato | | H02K 11/30 |
| | | | | 310/85 |
| 8,128,438 B2 * | 3/2012 | Bernard | | H02K 5/225 |
| | | | | 439/701 |
| 8,425,205 B2 * | 4/2013 | Li | | F04D 29/445 |
| | | | | 417/423.1 |
| 8,562,313 B2 * | 10/2013 | Andersen | | H02K 3/522 |
| | | | | 310/43 |
| 9,246,367 B2 * | 1/2016 | Ohashi | | H02K 5/04 |
| 9,595,854 B2 * | 3/2017 | Klopp | | H02K 5/225 |
| 10,116,183 B2 * | 10/2018 | Jacobsen | | F04D 25/06 |
| 10,476,183 B2 * | 11/2019 | Lee | | H01R 13/506 |
| 10,720,811 B2 * | 7/2020 | Hosoi | | H02K 5/161 |
| 12,101,003 B2 * | 9/2024 | Fujimoto | | F16H 57/027 |
| 2003/0102740 A1 * | 6/2003 | Marioni | | H02K 5/10 |
| | | | | 310/87 |
| 2004/0263009 A1 * | 12/2004 | Noda | | F04D 25/082 |
| | | | | 310/58 |
| 2008/0284265 A1 * | 11/2008 | Chaohai | | H02K 5/15 |
| | | | | 310/89 |
| 2010/0111729 A1 * | 5/2010 | Andersen | | F04D 13/064 |
| | | | | 310/88 |
| 2012/0013212 A1 * | 1/2012 | Vadillo | | H02K 9/06 |
| | | | | 310/88 |
| 2012/0230849 A1 * | 9/2012 | Yamada | | H02K 3/50 |
| | | | | 417/410.1 |
| 2015/0303761 A1 * | 10/2015 | Jacobsen | | F04D 25/06 |
| | | | | 310/71 |
| 2020/0232477 A1 * | 7/2020 | Kataoka | | F04D 29/528 |
| 2020/0313495 A1 | 10/2020 | Yamakage et al. | | |

* cited by examiner

INVERTER-INTEGRATED ELECTRIC MOTOR

CROSS-REFERENCE TO RELATED APPLICATION

This application claims priority to Japanese Patent Application No. 2022-046922 filed on Mar. 23, 2022, the entire disclosure of which is incorporated herein by reference.

The present disclosure relates to an inverter-integrated electric motor.

BACKGROUND ART

Japanese Patent Application Publication No. 2020-165423 discloses an inverter-integrated electric motor that includes a motor housing, an inverter housing, and a metallic terminal. The motor housing accommodates a motor. The inverter housing accommodates an inverter that drives the motor. The inverter housing is fixed to the motor housing. The inverter is electrically connected to the motor by the metallic terminal. The motor housing and the inverter housing each have a terminal insertion hole through which the metallic terminal is inserted. A sealing member is disposed between the motor housing and the inverter housing. The sealing member suppresses moisture intrusion into the terminal insertion hole.

The present disclosure, which has been made in light of the above-mentioned problem, is directed to providing an inverter-integrated electric motor that further suppresses moisture intrusion into a terminal insertion hole.

SUMMARY

In accordance with an aspect of the present disclosure, there is provided an inverter-integrated electric motor comprising: a motor housing for accommodating a motor; an inverter housing for accommodating an inverter that drives the motor, and a metallic terminal by which the inverter is electrically connected to the motor. The inverter housing is fixed to the motor housing. The motor housing and the inverter housing each have a projection having a terminal insertion hole through which the metallic terminal is inserted. The projection of the motor housing and the projection of the inverter housing project while approaching each other. The projection of the motor housing and the projection of the inverter housing each have a seal structure that surrounds the terminal insertion hole. One of the motor housing and the inverter housing has a main projected-guide portion projecting more than the projection of the one of the motor housing and the inverter housing and surrounding a part of the projection of the one of the motor housing and the inverter housing. The other of the motor housing and the inverter housing has an auxiliary projected-guide portion surrounding a part of the main projected-guide portion. The main projected-guide portion and the auxiliary projected-guide portion are configured to guide moisture intruded into a gap between the motor housing and the inverter housing to suppress moisture retention around the seal structure of the projection of the motor housing and the seal structure of the projection of the inverter housing.

Other aspects and advantages of the disclosure will become apparent from the following description, taken in conjunction with the accompanying drawings, illustrating by way of example the principles of the disclosure.

BRIEF DESCRIPTION OF THE DRAWINGS

The present disclosure together with objects and advantages thereof, may best be understood by reference to the following description of the embodiments together with the accompanying drawings in which.

DETAILED DESCRIPTION OF EMBODIMENTS

The following will describe an embodiment of an inverter-integrated electric motor with reference to accompanying FIGS. 1 to 5.

Figure 1:
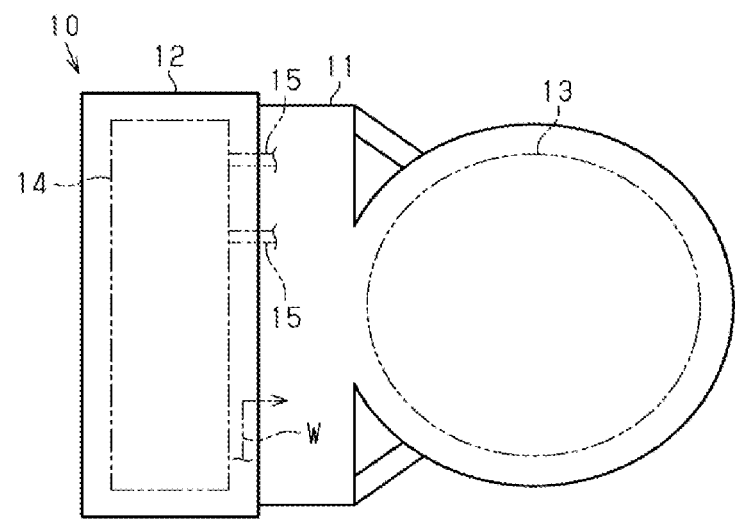
FIG. 1 is a schematic view of an inverter-integrated electric motor according to a first embodiment.

As illustrated in FIG. 1, an inverter-integrated electric motor 10 includes a motor housing 11, an inverter housing 12, a motor 13, an inverter 14, and a plurality of metallic terminals 15. The motor housing 11 accommodates the motor 13. The inverter housing 12 accommodates the inverter 14. The inverter housing 12 is fixed to the motor housing 11. The inverter 14 drives the motor 13. The inverter 14 is electrically connected to the motor 13 by the plurality of metallic terminals 15. The metallic terminals 15 include a resolver cable and a busbar, for example. Cooling water W for cooling the motor 13 and the inverter 14 flows through the inverter-integrated electric motor 10. The inverter-integrated electric motor 10 is mounted to a vehicle such that the motor housing 11 and the inverter housing 12 are arranged in the horizontal direction.

<Inverter Housing>

Figure 2:
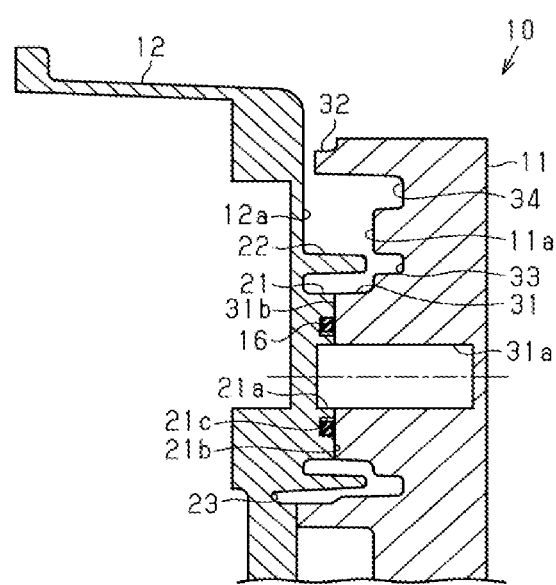
FIG. 2 is a fragmentary sectional view of the inverter-integrated electric motor according to the first embodiment.

As illustrated in FIG. 2, the inverter housing 12 has a surface 12a that faces the motor housing 11. The surface 12a of the inverter housing 12 is perpendicular to the horizontal direction.

The inverter housing 12 has a plurality of projections 21, in this embodiment, specifically, three projections 21, which project from the surface 12a toward the motor housing 11. Each of the projections 21 according to the embodiment has an approximately solid cylindrical shape. The projection 21 of the inverter housing 12 has a through hole 21a. The projection 21 has a leading surface 21b and a seal groove 21c that has a ring shape and is recessed in the leading surface 21b.

The plurality of projections 21 of the inverter housing 12 according to this embodiment include first to third projections 21. The through hole 21a of the first projection 21 serves as the terminal insertion hole of the present disclosure through which a resolver cable serving as the metallic terminal 15 is inserted. The through hole 21a of the second projection 21 serves as the terminal insertion hole of the present disclosure through which a busbar serving as the metallic terminal 15 is inserted. The through hole 21a of the third projection 21 serves as the cooling water passage of the present disclosure through which the cooling water W flows. That is, the third projection 21 serves as the water passage projection of the present disclosure.

The inverter housing 12 has a plurality of main projected-guide portions 22 that project from the surface 12a toward the motor housing 11. Specifically, the plurality of main projected-guide portions 22 of the inverter housing 12 according to this embodiment include three main projected-guide portions 22. The projection amount of each of the main projected-guide portions 22 from the surface 12a is greater than that of each of the projections 21 of the inverter housing 12. That is, the main projected-guide portion 22 projects from the surface 12a more than the projection 21 of the inverter housing 12.

Figure 3:
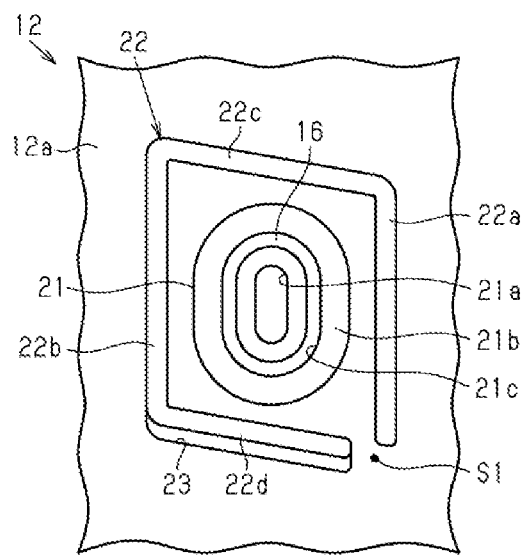
FIG. 3 is a side view of an inverter housing.

As illustrated in FIG. 3, each main projected-guide portion 22 surrounds a part of the corresponding projection 21 of the inverter housing 12. One of the three main projected-guide portions 22 serves as the water passage main projected-guide portion of the present disclosure that surrounds a part of the water passage projection.

Each main projected-guide portion 22 according to the embodiment has an approximately rectangular shape. The main projected-guide portion 22 has first to fourth portions 22a-22d. The first portion 22a and the second portion 22b extend along the gravity direction. The first portion 22a and the second portion 22b are respectively located on the opposite sides of the projection 21 in the horizontal direction. The third portion 22c is located above the projection 21 in the gravity direction. The third portion 22c connects therethrough the upper end of the first portion 22a and the upper end of the second portion 22b. The fourth portion 22d is located below the projection 21 in the gravity direction. The fourth portion 22d is connected to the lower end of the second portion 22b. The fourth portion 22d is not connected to the lower end of the first portion 22a. A gap S1 is formed between the first portion 22a and the fourth portion 22d. The third portion 22c and the fourth portion 22d are inclined with respect to the horizontal direction. The third portion 22c and the fourth portion 22d are inclined in the gravity direction while approaching the first portion 22a.

The inverter housing 12 has a plurality of grooves 23 that are recessed in the surface 12a. Each of the grooves 23 forms a part of the corresponding main projected-guide portion 22. Specifically, the groove 23 forms a part of the lower surface of the fourth portion 22d of the main projected-guide portion 22. The groove 23 extends along the fourth portion 22d of the main projected-guide portion 22. That is, the groove 23 is inclined in the gravity direction while approaching the first portion 22a of the main projected-guide portion 22.

<Motor Housing>

As illustrated in FIG. 2, the motor housing 11 has opposite surfaces, i.e., a surface 11a and a surface 11b, and the surface 11a faces the inverter housing 12. The surface 11a of the motor housing 11 is perpendicular to the horizontal direction.

The motor housing 11 has a plurality of projections 31 that project from the surface 11a toward the inverter housing 12. The projections 31 of the motor housing 11 according to the embodiment have an approximately solid cylindrical shape. Each of the projections 31 has a through hole 31a.

Specifically, the plurality of projections 31 of the motor housing 11 according to this embodiment include three projections 31, i.e., first to third projections 31. The through hole 31a of the first projection 31 serves as the terminal insertion hole of the present disclosure through which a resolver cable serving as the metallic terminal 15 is inserted. The through hole 31a of the second projection 31 serves as the terminal insertion hole of the present disclosure through which a busbar serving as the metallic terminal 15 is inserted. The through hole 31a of the third projection 31 serves as the cooling water passage of the present disclosure through which the cooling water W flows. That is, the third projection 31 serves as the water passage projection of the present disclosure.

The motor housing 11 has a plurality of auxiliary projected-guide portions 32 that project from the surface 11a toward the inverter housing 12. Specifically, the plurality of auxiliary projected-guide portions 32 of the motor housing 11 according to this embodiment include three auxiliary projected-guide portions 32. The projection amount of each of the auxiliary projected-guide portions 32 from the surface 11a is greater than that of each of the projections 31 of the motor housing 11. That is, the auxiliary projected-guide portion 32 projects from the surface 11a more than the projection 31 of the motor housing 11.

Figure 4:
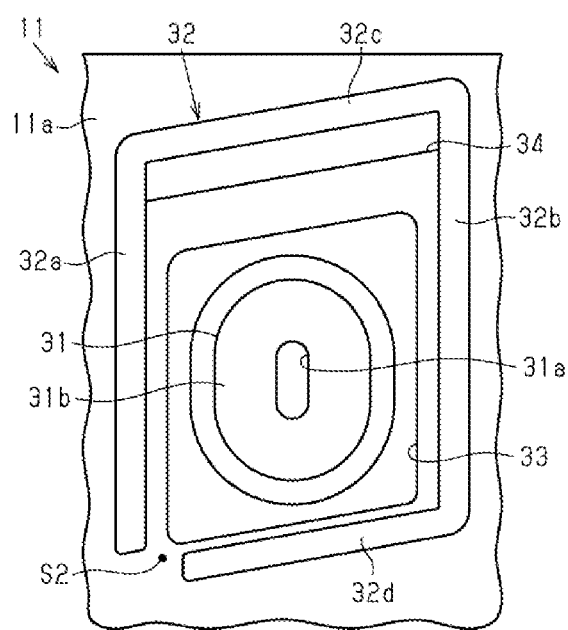
FIG. 4 is a side view of a motor housing.

As illustrated in FIG. 4, the auxiliary projected-guide portion 32 surrounds a part of the corresponding projection 31 of the motor housing 11. One of the three auxiliary projected-guide portions 32 serves as the water passage auxiliary projected-guide portion of the present disclosure that surrounds a part of the water passage projection.

Each auxiliary projected-guide portion 32 according to the embodiment has an approximately rectangular shape. The auxiliary projected-guide portion 32 has first to fourth portions 32a-32d. The first portion 32a and the second portion 32b extend along the gravity direction. The first portion 32a and the second portion 32b are respectively located on the opposite sides of the projection 31 in the horizontal direction. The third portion 32c is located above the projection 31 in the gravity direction. The third portion 32c connects therethrough the upper end of the first portion 32a and the upper end of the second portion 32b. The fourth portion 32d is located below the projection 31 in the gravity direction. The fourth portion 32d is connected to the lower end of the second portion 32b. The fourth portion 32d is not connected to the lower end of the first portion 32a. A gap S2 is formed between the first portion 32a and the fourth portion 32d. The third portion 32c and the fourth portion 32d are inclined with respect to the horizontal direction. The third portion 32c and the fourth portion 32d are inclined in the gravity direction while approaching the first portion 32a.

The motor housing 11 has a plurality of depressed-guide portions 33 that are depressed in the surface 11a. Each of the depressed-guide portions 33 surrounds the corresponding projection 31 of the motor housing 11. The outline of each depressed-guide portion 33 has an approximately rectangular shape.

The motor housing 11 has a plurality of grooves 34, and each of the grooves 34 is recessed in the surface 11a and serves as the guide groove of the present disclosure. Each of the grooves 34 forms a part of the corresponding auxiliary projected-guide portion 32. Specifically, the groove 34 forms a part of the lower surface of the third portion 32c of the auxiliary projected-guide portion 32. The groove 34 extends along the third portion 32c of the auxiliary projected-guide portion 32. That is, the groove 34 is inclined in the gravity direction while approaching the first portion 32a of the auxiliary projected-guide portion 32.

<Relationship Between Inverter Housing and Motor Housing>

As illustrated in FIG. 2, the motor housing 11 and the inverter housing 12 are arranged such that the surface 11a of the motor housing 11 faces the surface 12a of the inverter housing 12. The projection 31 of the motor housing 11 and the projection 21 of the inverter housing 12 respectively project from the motor housing 11 and the inverter housing 12 while approaching each other. The projection 31 of the motor housing 11 has a leading surface 31b, and the leading surface 31b is in contact with the leading surface 21b of the projection 21 of the inverter housing 12. The through hole 31a of the projection 31 of the motor housing 11 is in communication with the through hole 21a of the projection 21 of the inverter housing 12.

A sealing member 16 having a ring shape is disposed between the projection 31 of the motor housing 11 and the projection 21 of the inverter housing 12. The sealing member 16 is, for example, an O-ring. The sealing member 16 is disposed in the seal groove 21c of the projection 21 of the inverter housing 12. The sealing member 16 is in tightly contact with the surfaces of the seal groove 21c and the leading surface 31b of the projection 31 of the motor housing 11. The sealing member 16 seals a gap between the projection 31 of the motor housing 11 and the projection 21 of the inverter housing 12. Of the three projections 21, two projections 21, which each have the through hole 21a serving as the terminal insertion hole, each have a seal structure surrounding the terminal insertion hole. Similarly, of the three projections 31, two projections 31, which each have the through hole 31a serving as the terminal insertion hole, each have a seal structure surrounding the terminal insertion hole. One of the three projections 21, which has the through hole 21a serving as the cooling water passage, has a water passage seal structure surrounding the cooling passage. Similarly, one of the three projections 31, which has the through hole 31a serving as the cooling water passage, has a water passage seal structure surrounding the cooling passage.

Figure 5:
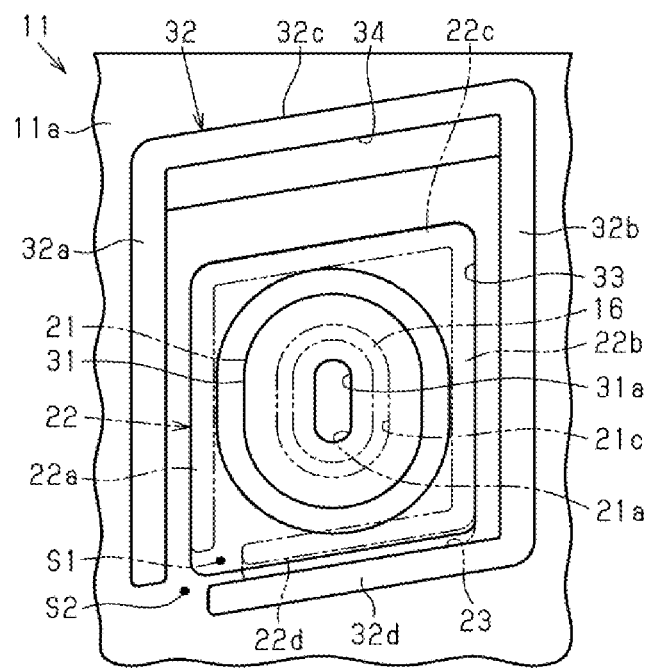
FIG. 5 is a side view of the motor housing, explaining a position of a guide portion.

As illustrated in FIGS. 2 and 5, the main projected-guide portion 22 surrounds a part of the projection 21 of the inverter housing 12 and a part of the projection 31 of the motor housing 11. The distal end of the main projected-guide portion 22 faces the depressed-guide portion 33. The auxiliary projected-guide portion 32 surrounds a part of the corresponding main projected-guide portion 22. That is, the projection 21 of the inverter housing 12 and the projection 31 of the motor housing 11 are surrounded by two guide portions, i.e., the main projected-guide portion 22 and the auxiliary projected-guide portion 32. A gap is formed between a part of the surface 11a of the motor housing 11 located outside of the auxiliary projected-guide portion 32 and the surface 12a of the inverter housing 12.

[Operation]

Next, the following will explain the operation according to the embodiment. The motor housing 11 and the inverter housing 12 respectively have the projection 31 and the projection 21 that project while approaching each other. The projection 21 of the inverter housing 12 and the projection 31 of the motor housing 11 respectively have the through hole 21a and the through hole 31a. The projection 21 of the inverter housing 12 has a seal structure that surrounds the through hole 21a, and the projection 31 of the motor housing 11 has a seal structure that surrounds the through hole 31a. The inverter housing 12 has the main projected-guide portion 22 that projects more than the projection 21 of the inverter housing 12 and surrounds a part of the projection 21 of the inverter housing 12. The motor housing 11 has the auxiliary projected-guide portion 32 that surrounds a part of the main projected-guide portion 22. That is, the seal structure of the through hole 21a of the inverter housing 12 and the seal structure of the through hole 31a of the motor housing 11 are doubly surrounded by the main projected-guide portion 22 and the auxiliary projected-guide portion 32.

Accordingly, the auxiliary projected-guide portion 32 located circumferentially outermost serves as an obstacle that causes moisture intruded into a gap between the motor housing 11 and the inverter housing 12 to be unlikely to flow toward the seal structures. Further, the main projected-guide portion 22 is disposed inside the auxiliary projected-guide portion 32 in case that moisture flows over the auxiliary projected-guide portion 32 and intrudes into the inside of the auxiliary projected-guide portion 32. Accordingly, the main projected-guide portion 22 serves as an obstacle that causes the moisture intruded into the inside of the auxiliary projected-guide portion 32 to be unlikely to flow toward the seal structures. As such, the main projected-guide portion 22 and the auxiliary projected-guide portion 32 serve as a double obstacle that causes the moisture intruded into the gap between the motor housing 11 and the inverter housing 12 to be unlikely to reach the seal structures.

Furthermore, the main projected-guide portion 22 and the auxiliary projected-guide portion 32 are configured to guide the moisture intruded into the gap between the motor housing 11 and the inverter housing 12, thereby suppressing moisture retention around the seal structures. The following will explain about the guide of the moisture by the main projected-guide portion 22 and the auxiliary projected-guide portion 32.

First, the following will explain about a flow of the moisture intruded from the top of the inverter-integrated electric motor 10 into the gap between the motor housing 11 and the inverter housing 12.

The moisture, which has intruded from the top of the inverter-integrated electric motor 10 into the gap between the motor housing 11 and the inverter housing 12, flows to the upper surface of the third portion 32c of the auxiliary projected-guide portion 32. The third portion 32c is inclined with respect to the horizontal direction. Accordingly, the moisture on the upper surface of the third portion 32c flows toward the first portion 32a, and flows down along the outer surface of the first portion 32a in the gravity direction.

The moisture, which has intruded from the top of the inverter-integrated electric motor 10 into the gap between the motor housing 11 and the inverter housing 12, may partly intrude into the inside of the auxiliary projected-guide portion 32 through a gap between the surface 12a of the inverter housing 12 and the distal end of the third portion 32c of the auxiliary projected-guide portion 32.

The moisture, which has intruded into the inside of the auxiliary projected-guide portion 32 along the distal end of the third portion 32c, enters the groove 34 of the motor housing 11. The groove 34 of the motor housing 11 is inclined with respect to the horizontal direction. The moisture in the groove 34 flows toward the first portion 32a of the auxiliary projected-guide portion 32. The moisture reached the end of the groove 34 flows down along the inner surface of the first portion 32a in the gravity direction, and is discharged to the outside of the auxiliary projected-guide portion 32 through the gap S2 of the auxiliary projected-guide portion 32.

The moisture, which has intruded into the inside of the auxiliary projected-guide portion 32 through the gap between the surface 12a of the inverter housing 12 and the distal end of the third portion 32c of the auxiliary projected-guide portion 32, flows to the upper surface of the third portion 22c of the main projected-guide portion 22. The third portion 22c is inclined with respect to the horizontal direction. Accordingly, the moisture on the upper surface of the third portion 22c flows toward the first portion 22a of the main projected-guide portion 22 and flows down along the outer surface of the first portion 22a in the gravity direction. Then, the moisture is discharged to the outside of the auxiliary projected-guide portion 32 through the gap S2 of the auxiliary projected-guide portion 32.

The moisture, which has intruded into the inside of the auxiliary projected-guide portion 32, may partly intrude into the inside of the main projected-guide portion 22 through a gap between the third portion 22c of the main projected-guide portion 22 and the depressed-guide portion 33. The moisture, which has intruded into the inside of the main projected-guide portion 22, flows to the upper surface of the projection 21 and the upper surface of the projection 31. The projections 21, 31 each have a solid cylindrical shape. Accordingly, the moisture on the upper surface of the projection 21 and the upper surface of the projection 31 flows down along the outer peripheral surface of the projection 21 and the outer peripheral surface of the projection 31 in the gravity direction. The moisture reaches the lower surface of the projection 21 and the lower surface of the projection 31, and flows down to the fourth portion 22d of the main projected-guide portion 22. The fourth portion 22d is inclined with respect to the horizontal direction. Accordingly, the moisture flows toward the first portion 22a from the fourth portion 22d and is discharged to the outside of the main projected-guide portion 22 through the gap S1 of the main projected-guide portion 22. Then, the moisture is further discharged to the outside of the auxiliary projected-guide portion 32 through the gap S2 of the auxiliary projected-guide portion 32.

Next, the following will explain about a flow of the moisture intruded from the side of the inverter-integrated electric motor 10 into the gap between the motor housing 11 and the inverter housing 12.

The moisture, which has intruded from the side of the inverter-integrated electric motor 10 into the gap between the motor housing 11 and the inverter housing 12, comes in contact with the outer surface of the first portion 32a or the outer surface of the second portion 32b of the auxiliary projected-guide portion 32. The first portion 32a and the second portion 32b extend along the gravity direction. Accordingly, the moisture flows down along the first portion 32a or the second portion 32b in the gravity direction.

The moisture, which has intruded from the lateral side of the inverter-integrated electric motor 10 into the gap between the motor housing 11 and the inverter housing 12, may partly flow over the first portion 32a or the second portion 32b of the auxiliary projected-guide portion 32 and intrude into the inside of the auxiliary projected-guide portion 32. The moisture, which has intruded into the inside of the auxiliary projected-guide portion 32, comes in contact with the outer surface of the first portion 22a or the outer surface of the second portion 22b of the main projected-guide portion 22. The first portion 22a and the second portion 22b extend along the gravity direction. Accordingly, the moisture flows down along the outer surface of the first portion 22a or the outer surface of the second portion 22b in the gravity direction.

The moisture flowed to the lower end of the first portion 22a is discharged to the outside of the auxiliary projected-guide portion 32 through the gap S1 of the main projected-guide portion 22. The moisture flowed to the lower end of the second portion 22b enters the groove 23 of the inverter housing 12. The groove 23 of the inverter housing 12 is inclined with respect to the horizontal direction. Accordingly, the moisture flows toward the first portion 22a of the main projected-guide portion 22 from the groove 23 of the inverter housing 12 and is discharged to the outside of the auxiliary projected-guide portion 32 through the gap S2 of the auxiliary projected-guide portion 32.

The moisture, which has intruded into the inside of the auxiliary projected-guide portion 32, may partly flow over the first portion 22a or the second portion 22b of the main projected-guide portion 22 and intrude into the inside of the main projected-guide portion 22. The moisture, which has intruded into the inside of the main projected-guide portion 22, comes in contact with the outer peripheral surface of the projection 21 and the outer peripheral surface of the projection 31, and flows down along the outer peripheral surface of the projection 21 and the outer peripheral surface of the projection 31 in the gravity direction. The further flow of the moisture has been already explained, and is not elaborated here.

[Advantageous Effect]

Next, the following will explain the advantageous effects according to the embodiment.

(1) The motor housing 11 and the inverter housing 12 respectively have the projection 31 and the projection 21 that project while approaching each other. The projection 21 has the through hole 21a that serves as the terminal insertion hole through which the metallic terminal 15 is inserted. The projection 31 has the through hole 31a that serves as the terminal insertion hole through which the metallic terminal 15 is inserted. The projection 21 of the inverter housing 12 has a seal structure that surrounds the through hole 21a, and the projection 31 of the motor housing 11 has a seal structure that surrounds the through hole 31a. The inverter housing 12 has the main projected-guide portion 22 that projects more than the projection 21 of the inverter housing 12 and surrounds a part of the projection 21 of the inverter housing 12. The motor housing 11 has the auxiliary projected-guide portion 32 that surrounds a part of the main projected-guide portion 22. That is, the seal structure of the through hole 21a of the inverter housing 12 and the seal structure of the through hole 31a of the motor housing 11 are doubly surrounded by the main projected-guide portion 22 and the auxiliary projected-guide portion 32. As such, the main projected-guide portion 22 and the auxiliary projected-guide portion 32 each serve as an obstacle that causes the moisture intruded into the gap between the motor housing 11 and the inverter housing 12 to be unlikely to reach the seal structures. Furthermore, the main projected-guide portion 22 and the auxiliary projected-guide portion 32 guide the moisture intruded into the gap between the motor housing 11 and the inverter housing 12, thereby suppressing the moisture retention around the seal structures. This configuration suppresses the moisture intrusion into the through holes 21a, 31a as the terminal insertion holes.

(2) The motor housing 11 has the depressed-guide portion 33 that faces the main projected-guide portion 22. The main projected-guide portion 22 and the depressed-guide portion 33 cooperate to form a labyrinth seal. This configuration causes the moisture intruded into the gap between the motor housing 11 and the inverter housing 12 to be unlikely to reach the seal structures. This configuration therefore further suppresses the moisture intrusion into the through holes 21a, 31a.

(3) The moisture, which has intruded into the gap between the motor housing 11 and the inverter housing 12, may intrude into the inside of the auxiliary projected-guide portion 32 along the auxiliary projected-guide portion 32. The moisture then enters the groove 34 of the motor housing 11, which forms a part of the auxiliary projected-guide portion 32. The groove 34 of the motor housing 11 is configured to guide the moisture intruded into the gap between the motor housing 11 and the inverter housing 12, thereby suppressing the moisture retention around the seal structures. This configuration therefore further suppresses the moisture intrusion into the through holes 21a, 31a.

(4) The motor housing 11 and the inverter housing 12 respectively have the projection 31 and the projection 21 that project while approaching each other. The projection 21 has the through hole 21a that serves as the cooling water passage through which the cooling water W flows. The projection 31 has the through hole 31a that serves as the cooling water passage through which the cooling water W flows. The projection 21 of the inverter housing 12 has a seal structure that surrounds the through hole 21a, and the projection 31 of the motor housing 11 has a seal structure that surrounds the through hole 31a. The inverter housing 12 has the main projected-guide portion 22 that projects more than the projection 21 of the inverter housing 12 and surrounds a part of the projection 21 of the inverter housing 12. The motor housing 11 has the auxiliary projected-guide portion 32 that surrounds a part of the main projected-guide portion 22. That is, the seal structure of the through hole 21a of the inverter housing 12 and the seal structure of the through hole 31a of the motor housing 11 are doubly surrounded by the main projected-guide portion 22 and the auxiliary projected-guide portion 32. As such, the main projected-guide portion 22 and the auxiliary projected-guide portion 32 each serve as an obstacle that causes the moisture intruded into the gap between the motor housing 11 and the inverter housing 12 to be unlikely to reach the seal structures. Furthermore, the main projected-guide portion 22 and the auxiliary projected-guide portion 32 guide the moisture intruded into the gap between the motor housing 11 and the inverter housing 12, thereby suppressing the moisture retention around the seal structures. This configuration therefore suppresses the moisture intrusion into the through holes 21a, 31a each serving as the cooling water passage.

(5) The main projected-guide portion 22 projects more than the projection 21 of the inverter housing 12. This configuration allows the main projected-guide portion 22 to surround a connecting point between the projection 21 of the inverter housing 12 and the projection 31 of the motor housing 11. Similarly, the auxiliary projected-guide portion 32 projects more than the projection 31 of the motor housing 11. This configuration allows the auxiliary projected-guide portion 32 to surround the connecting point between the projection 21 of the inverter housing 12 and the projection 31 of the motor housing 11. Accordingly, those configurations further suppress the moisture intrusion into the connecting point between the projection 21 of the inverter housing 12 and the projection 31 of the motor housing 11.

(6) The main projected-guide portion 22 and the auxiliary projected-guide portion 32 guide the moisture intruded into the gap between the motor housing 11 and the inverter housing 12, thereby suppressing the moisture retention around the seal structures. This suppresses corrosion of the seal structures by the moisture. This therefore eliminates the need for anodizing for enhancing corrosion resistance of the motor housing 11 and the inverter housing 12.

[Modification]

The aforementioned embodiment may be modified as below. The embodiment may be combined with the following modifications within technically consistent range.

The main projected-guide portion 22 may be formed in the motor housing 11, and the auxiliary projected-guide portion 32 and the depressed-guide portion 33 may be formed in the inverter housing 12.

The main projected-guide portion 22 according to the aforementioned embodiment surrounds the almost whole circumference of the projection 21 and the almost whole circumference of the projection 31 except for the gap S1, but the areas of the projection 21 and the projection 31 surrounded by the main projected-guide portion 22 may be narrowed.

The auxiliary projected-guide portion 32 according to the aforementioned embodiment surrounds the almost whole circumference of the main projected-guide portion 22 except for the gap S2, but the area of the main projected-guide portion 22 surrounded by the auxiliary projected-guide portion 32 may be narrowed.

If the two projections 21 are disposed close to each other and the two projections 31 are disposed close to each other, a part of the main projected-guide portion 22 surrounding one of the two projections 21 and one of the two projections 31 may serve as a part of the main projected-guide portion 22 surrounding the other of the two projections 21 and the other of the two projections 31.

If the two projections 21 are disposed close to each other and the two projections 31 are disposed close to each other, the auxiliary projected-guide portion 32 may surround both of the main projected-guide portion 22 surrounding one of the two projections 21 and one of the two projections 31 and the main projected-guide portion 22 surrounding the other of the two projections 21 and the other of the two projections 31.

The groove 23 of the inverter housing 12 may be omitted.

The groove 23 of the inverter housing 12 does not necessarily form a part of the main projected-guide portion 22.

The depressed-guide portion 33 may be omitted. In this configuration, the distal end of the main projected-guide portion 22 faces the surface 11a of the motor housing 11.

The groove 34 of the motor housing 11 may be omitted.

The groove 34 of the motor housing 11 does not necessarily form a part of the auxiliary projected-guide portion 32.

The shapes of the main projected-guide portion 22 and the auxiliary projected-guide portion 32 according to the aforementioned embodiment are examples. The shapes of the main projected-guide portion 22 and the auxiliary projected-guide portion 32 are not limited to the shapes mentioned in the embodiment as long as the main projected-guide portion 22 and the auxiliary projected-guide portion 32 guide the moisture intruded into the gap between the motor housing 11 and the inverter housing 12 so as to suppress the moisture retention around the seal structures.

The motor 13 and the inverter 14 may not be cooled by the cooling water W. This eliminates the need for a water passage projection, a water passage main projected-guide portion, and a water passage auxiliary projected-guide portion.

Figure 6:
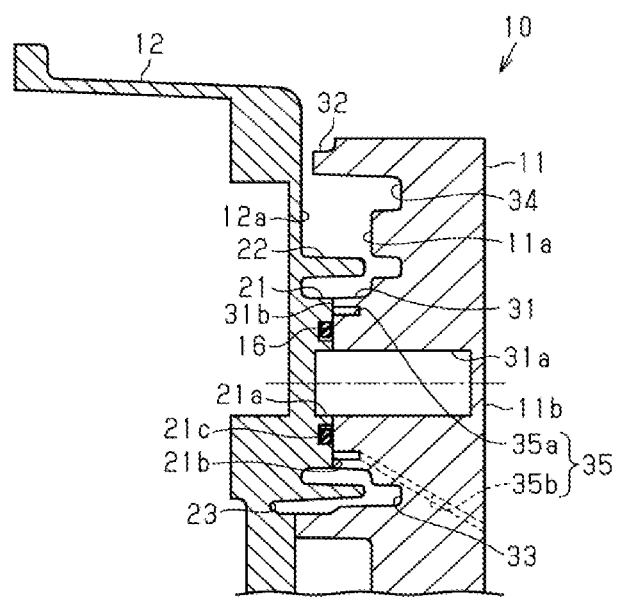
FIG. 6 is a fragmentary sectional view of an inverter-integrated electric motor according to a modification example.

As illustrated in FIG. 6, the motor housing 11 may have a discharge passage 35 through which a gap between the projection 31 and the projection 21 is connected to the outside of the motor housing 11. The discharge passage 35 includes a first passage 35a and a second passage 35b. The first passage 35a is recessed in the leading surface 31b of the projection 31 of the motor housing 11. The first passage 35a surrounds the sealing member 16. The first passage 35a has a slit shape. FIG. 6 exaggerates the width of the first passage 35a. The bottom surface of the first passage 35a is connected to the outside of the motor housing 11 through the second passage 35b. The second passage 35b is opened on the surface 11b of the motor housing 11, for example.

In this configuration, even if the moisture intrudes into the gap between the projection 31 of the motor housing 11 and the projection 21 of the inverter housing 12, the moisture enters the first passage 35a before reaching the sealing member 16. Specifically, capillary action occurs because of the slit shape of the first passage 35a, so that the moisture intruded into the gap between the projection 31 of the motor housing 11 and the projection 21 of the inverter housing 12 enters the first passage 35a. The moisture flows from the first passage 35a to the second passage 35b by gravity, and is discharged to the outside of the motor housing 11 through the second passage 35b. This configuration prevents the moisture from reaching the sealing member 16. This configuration therefore suppresses corrosion of the sealing member 16.

The discharge passage 35 may be formed in the inverter housing 12 instead of the motor housing 11. Alternatively, the discharge passage 35 may be formed in both of the motor housing 11 and the inverter housing 12.

Figure 7:
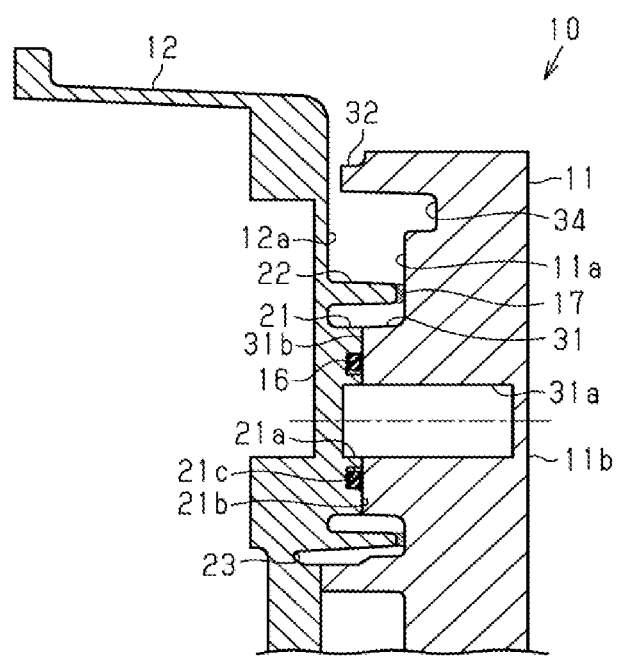
FIG. 7 is a fragmentary sectional view of an inverter-integrated electric motor according to a modification example.

As illustrated in FIG. 7, a liquid gasket 17 may be disposed in a gap between the main projected-guide portion 22 and the motor housing 11 that faces the main projected-guide portion 22, and the liquid gasket 17 may surround the projection 31. In this configuration, the liquid gasket 17 suppresses the moisture intrusion into the inside of the main projected-guide portion 22. This configuration therefore further suppresses the moisture intrusion into the through holes 21a, 31a. Instead of the liquid gasket 17, an O-ring may be disposed.

What is claimed is:

1. An inverter-integrated electric motor comprising:
a motor housing for accommodating a motor;
an inverter housing for accommodating an inverter that drives the motor, the inverter housing being fixed to the motor housing; and
a metallic terminal by which the inverter is electrically connected to the motor, wherein
the motor housing and the inverter housing each have a projection having a terminal insertion hole through which the metallic terminal is inserted, wherein the projection of the motor housing and the projection of the inverter housing project while approaching each other,
the projection of the motor housing and the projection of the inverter housing each have a seal structure that surrounds the terminal insertion hole,
one of the motor housing and the inverter housing has a main projected-guide portion projecting more than the projection of the one of the motor housing and the inverter housing and surrounding a part of the projection of the one of the motor housing and the inverter housing, and the other of the motor housing and the inverter housing has an auxiliary projected-guide portion surrounding a part of the main projected-guide portion, and
the main projected-guide portion and the auxiliary projected-guide portion are configured to guide moisture intruded into a gap between the motor housing and the inverter housing to suppress moisture retention around the seal structure of the projection of the motor housing and the seal structure of the projection of the inverter housing.

2. The inverter-integrated electric motor according to claim 1, wherein
the motor housing and the inverter housing each have a water passage projection having a cooling water passage through which cooling water for cooling the motor and the inverter flows, wherein the water passage projection of the motor housing and the water passage projection of the inverter housing project while approaching each other,
the water passage projection of the motor housing and the water passage projection of the inverter housing each have a water passage seal structure that surrounds the cooling water passage,
the one of the motor housing and the inverter housing has a water passage main projected-guide portion projecting more than the water passage projection of the one of the motor housing and the inverter housing and surrounding a part of the water passage projection of the one of the motor housing and the inverter housing, and the other of the motor housing and the inverter housing has a water passage auxiliary projected-guide portion surrounding a part of the water passage main projected-guide portion, and
the water passage main projected-guide portion and the water passage auxiliary projected-guide portion are configured to guide the moisture intruded into the gap between the motor housing and the inverter housing to suppress the moisture retention around the water passage seal structure of the water passage projection of the motor housing and the water passage seal structure of the water passage projection of the inverter housing.

3. The inverter-integrated electric motor according to claim 1, wherein
a liquid gasket is disposed in a gap between the main projected-guide portion and the other of the motor housing and the inverter housing that faces the main projected-guide portion, and the liquid gasket surrounds the projection of the other of the motor housing and the inverter housing.

4. The inverter-integrated electric motor according to claim 1, wherein
the other of the motor housing and the inverter housing has a depressed-guide portion that faces the main projected-guide portion.

5. The inverter-integrated electric motor according to claim 4, wherein
the other of the motor housing and the inverter housing has a guide groove that forms a part of the auxiliary projected-guide portion, and
the guide groove is configured to guide the moisture intruded into the gap between the motor housing and the inverter housing to suppress the moisture retention around the seal structure of the projection of the motor housing and the seal structure of the projection of the inverter housing.

* * * * *